(12) United States Patent
Chang et al.

(10) Patent No.: US 8,441,939 B2
(45) Date of Patent: May 14, 2013

(54) CABLE MODEM ACCESS USING LAYER-2 MESSAGING

(75) Inventors: Che-Ming Chang, Cary, NC (US); Jeffrey Riddel, Cary, NC (US); Gangadharan Byju Pularikkal, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 12/339,277

(22) Filed: Dec. 19, 2008

(65) Prior Publication Data

US 2010/0162336 A1    Jun. 24, 2010

(51) Int. Cl.
*H04J 3/14*    (2006.01)

(52) U.S. Cl.
USPC ........... 370/241; 370/242; 370/245; 725/107; 725/111

(58) Field of Classification Search .................. 370/241, 370/467, 469, 475; 726/111
See application file for complete search history.

(56) References Cited

U.S. PATENT DOCUMENTS

| | | | |
|---|---|---|---|
| 6,588,016 B1* | 7/2003 | Chen et al. ..................... | 725/111 |
| 6,594,305 B1* | 7/2003 | Roeck et al. .................. | 375/222 |
| 6,603,758 B1 | 8/2003 | Schmuelling et al. | |
| 6,750,879 B2* | 6/2004 | Sandberg ....................... | 715/714 |
| 6,751,230 B1* | 6/2004 | Vogel et al. ................... | 370/432 |
| 6,823,480 B1* | 11/2004 | Brown ............................ | 714/44 |
| 7,126,920 B2* | 10/2006 | Venkatesulu et al. ......... | 370/241 |
| 7,266,726 B1 | 9/2007 | Ladd et al. | |
| 7,308,700 B1 | 12/2007 | Fung et al. | |
| 7,573,936 B2* | 8/2009 | Hung ............................ | 375/222 |
| 2002/0136165 A1* | 9/2002 | Ady et al. ..................... | 370/241 |
| 2005/0050161 A1* | 3/2005 | Arnold et al. ................. | 709/217 |
| 2007/0047449 A1* | 3/2007 | Berger et al. ................. | 370/241 |

* cited by examiner

*Primary Examiner* — Ricky Ngo
*Assistant Examiner* — Rasheed Gidado
(74) *Attorney, Agent, or Firm* — BainwoodHuang

(57) ABSTRACT

In one embodiment, a method comprises receiving notification of a cable modem operational issue for a cable modem and establishing layer-2 logging communications with the cable modem. The method comprises receiving a message from the cable modem, the message generated by the cable modem in response to the operational issue and indicating the operational issue associated with the cable modem.

26 Claims, 3 Drawing Sheets

CABLE MODEM ACCESS USING LAYER-2 MESSAGING

BACKGROUND

The present disclosure pertains generally to transmission of data over a cable network between a cable modem termination system and cable modems.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

A cable network conventionally employs cable modems, which provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert a downstream RF signal to digital form. The conversion is done at a subscriber's home. At a cable modem termination system (CMTS) located at a head end of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
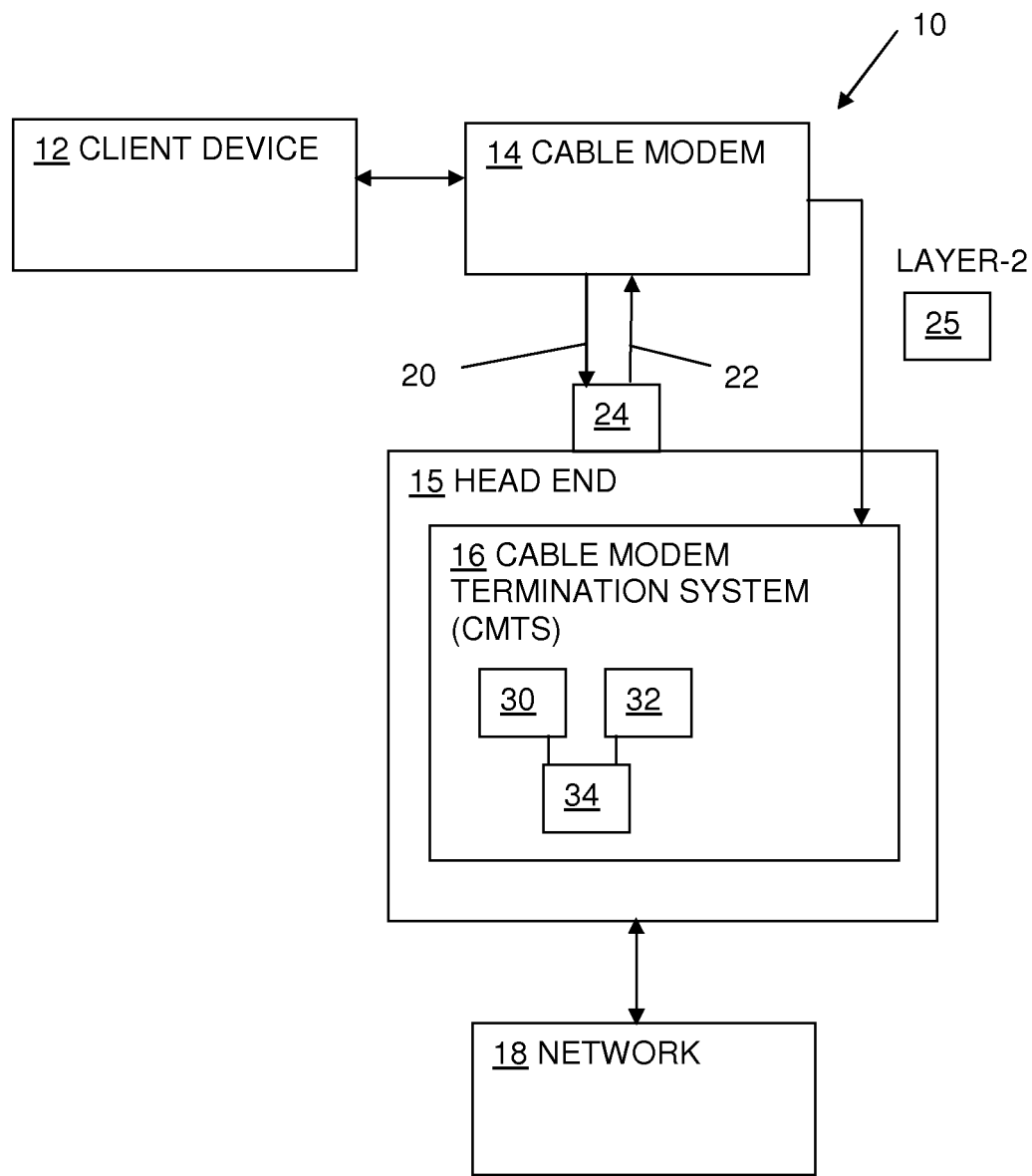
FIG. 1 illustrates an example schematic representation of a cable network system.

Cable networks typically utilize the Data Over Cable Service Interface Specification (DOCSIS) which defines communication requirements for the cable networks. In a DOCSIS-based network, each cable modem of the network executes an Internet Protocol (IP) connectivity procedure in order to allow the exchange of state information between the cable modem and a corresponding CMTS and to establish a layer-3 connection with the CMTS.

During operation of a conventional cable network, the cable modems can encounter operational problems or errors. Typically, when a cable modem encounters an operational error, the cable modem logs the error in an error file, termed a system level log or syslog. When generating the syslog, the cable modem can include level information in the syslog indicating the severity of the error (i.e., warning, emergency, etc.) and the facility associated with the error (i.e., Dynamic Host Configuration Protocol (DHCP), Trivial File Hosting Protocol (THCP), registration, etc.). The cable modem can forward the syslog to a secondary device for processing in order to determine the nature of the error. For example, in conventional cable networks the cable modem transmits the syslog information over IP to a system level log server associated with the cable network. This requires successful completion of the DOCSIS initialization of the cable modem, successful Baseline Privacy Interface (i.e., BPI+) security negotiation between the cable modem and CMTS, as well as IP connectivity between the cable modem and system level log server.

In certain cases, however, after generating the syslog, the cable modem may be unable to deliver the syslog to the system level log server or the system level log server may be unable to retrieve the syslog from the cable modem for a variety of reasons. For example, during an initialization procedure, the cable modem can enter and remain in one of the intermediate initialization states (e.g., init(rc), init(d), init(io), init(dr), or init(i)) during an Internet Protocol (IP) connectivity initialization procedure. In the event the cable modem remains in an initialization state, the cable modem cannot establish a layer-3 network or IP connection with the CMTS. While the cable modem in such a case has established layer-2 connectivity with the CMTS per the DOCSIS specification, IP connectivity may not function. Without functioning IP connectivity with the CMTS, the system level log server is unable to receive the syslog generated by the cable modem via the CMTS in order to identify and troubleshoot issues detected by the cable modem. Accordingly, the system level log server operator can contact the cable modem subscriber directly in an effort to retrieve the syslog. It would be desirable that the syslog generated by a cable modem be accessible by a corresponding CMTS and/or separate system level log server in the absence of established IP connectivity to allow the server to troubleshoot issues detected by the cable modem.

Generally, a disclosed method includes receiving notification of a cable modem operational issue for a cable modem, establishing layer-2 logging communications with the cable modem, and receiving a message from the cable modem via the layer-2 logging communications, the message generated by the cable modem in response to the operational issue and indicating the operational issue associated with the cable modem.

Description of Example Embodiments

FIG. 1 is an example schematic representation of a cable network system 10, such as a hybrid fiber-coaxial (HFC) cable network system. The cable network system 10 includes a client device 12, such as a user's laptop or desktop computer, and a cable modem 14 disposed in electrical communication with the client device 12, such as via an Ethernet cable, USB cable, or wireless connection. While a single cable modem 14 and client device 12 are illustrated, the cable network system 10 can include a number of cable modems 14 and corresponding client devices 12.

Each cable modem 14 in the cable network system 10 has a corresponding media access control (MAC) address and one or more service identifiers (SIDs). The MAC address identifies the cable modem 14 as being part of the cable network system 10 while the SID identifies a type of service associated with the cable modem 14.

The cable network system 10 also includes a distribution hub or head end 15 disposed in electrical communication with the cable modem 14. The head end 15 is configured to exchange data signals between the cable modem 14 and a network 18, such as a Wide Area Network (WAN). The head end 15 connects with the cable modems 14 of the system 10 through a pair of fiber optic lines 20, 22 and a series of fiber nodes 24. In one arrangement, each of the fiber nodes 24 is connected by a coaxial cable to two-way amplifiers or duplex filters, which permit certain frequencies to go in one direction and other frequencies to go in the opposite direction (i.e., different frequency ranges are used for upstream and downstream paths). A typical implementation serves around 500 subscribers per fiber node. The fiber node 24, coaxial cable, two-way amplifiers, along with a trunk line and subscriber branch lines, make up a coaxial distribution portion of cable network system 10. A subscriber tap from the head end 15 is, in turn, connected to the cable modem 14 and is configured to carry signals between the cable modem 14 and the the head end 15.

The head end 15 includes a CMTS 16 that is configured to transmit and receive signals with the cable modem 14. For example, in one arrangement the CMTS 16 is configured to exchange signals between the cable modem 14 and the network 18 while converting the signals to a format suitable for use by the network 18 and the cable modem 14 (e.g., convert between microwave signals to electrical signals). For example, the CMTS 16 includes a modulator configured to modulate signal provided to the cable modem 14 and includes a demodulator 32 configured to demodulate signals received from the cable modem 14. The CMTS 16 also includes a controller 34, such as a memory and a processor, disposed in electrical communication with the modulator 30 and demodulator 32.

The cable network system 10, in one arrangement, is configured with a Data Over Cable Service Interface Specification (DOCSIS) which allows the exchange of certain state information between the cable modem 14 and the and CMTS 16 prior to the establishment of an Internet Protocol (IP) connection between the cable modem 14 and the CMTS 16. In one arrangement, the DOCSIS specification includes MAC management ranging request messages and ranging response messages which enable the exchange of state information between the cable modem 14 and the and CMTS 16.

For example, the cable modem 14 initiates establishment of connection with the CMTS 16 by transmitting a ranging request message to the CMTS 16 on an upstream channel. In response to the ranging request message, the CMTS 16 transmits a ranging response MAC message to the cable modem 14 on a downstream channel. Once the cable modem 14 has successfully completed the ranging process the cable modem 14 can establish an IP connection (i.e., a Layer-3 or network layer connection) with the CMTS 16 such as by using the Dynamic Host Configuration Protocol (DHCP).

As indicated above, during operation the cable modem 14 can encounter operational problems or errors and as a result can log the error in an error file, termed a system level log or syslog message. However, in the event that the error occurs before or during the establishment of the IP connection with the CMTS 16, the CMTS 16 cannot retrieve the syslog message from the cable modem 14 for further analysis via layer-3 or network layer communications. Accordingly, in the present embodiment the CMTS 16 is configured to collect error messages 25, such as syslog messages, generated by a cable modem 14 using a layer-2 or data link layer connection, such as provided by DOCSIS. This functionality can be used as a tool to troubleshoot and isolate cable modem issues within a cable network system 10, such as a DOCSIS based cable network system.

Figure 2:
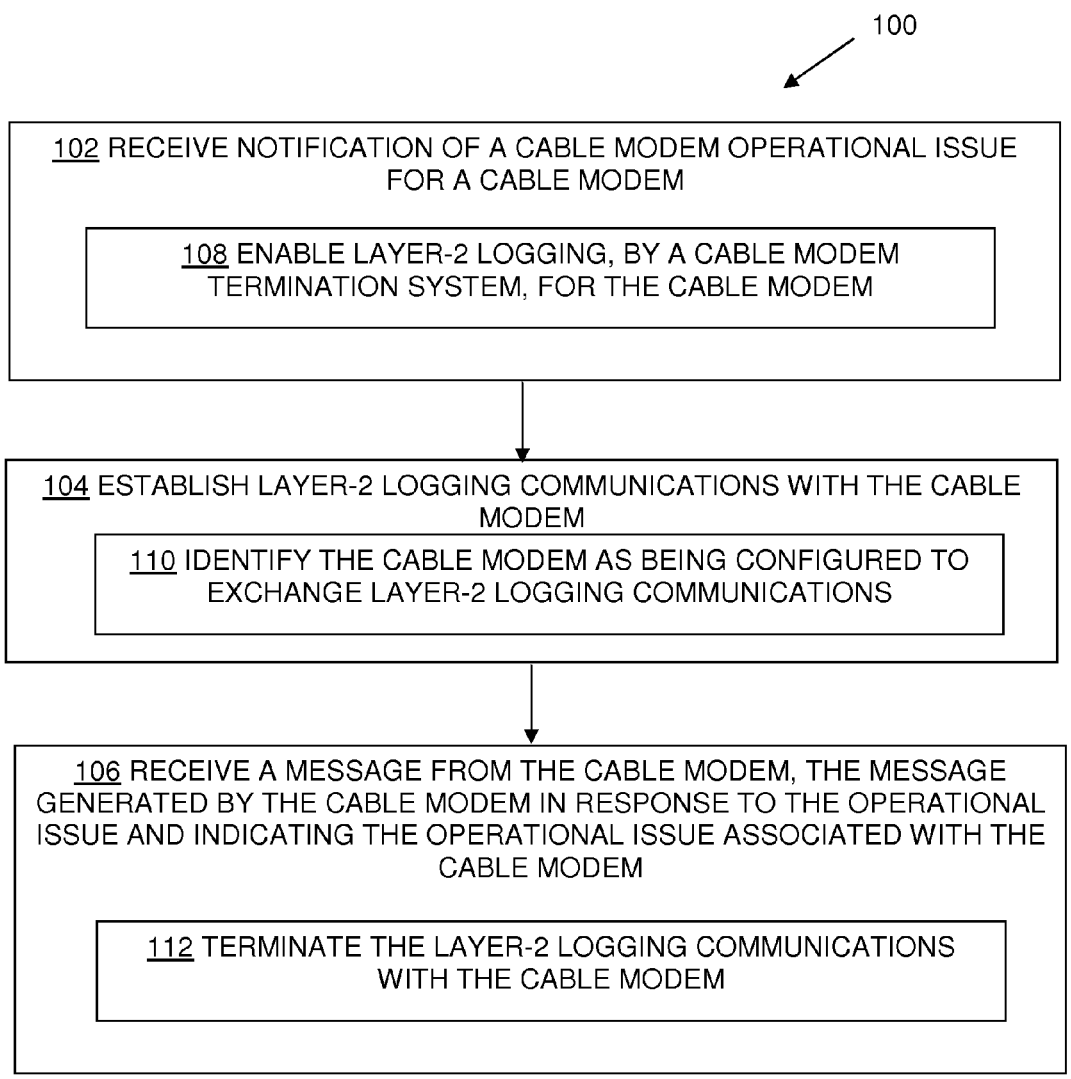
FIG. 2 illustrates an example method for accessing an operational message generated by a cable modem.

FIG. 2 is a flowchart 100 illustrating an example method for accessing an operational message generated by a cable modem 14, such as performed by a CMTS 16.

In step 102, the CMTS 16 receives notification of a cable modem operational issue for a cable modem 14. For example, assume a cable modem of the cable network system 10, such as cable modem 14, encounters an operational error and, as a result, cannot gain IP access to the CMTS 16. In one arrangement, the CMTS 16 receives notification regarding the operational issue associated with the CMTS 16. For example, when the end user of the cable modem detects the cable modem 14 as lacking IP functionality and/or connectivity, the end user contacts the MSO, such as by telephone, and provided the MSO with notification regarding the operational state of the cable modem 14. As a result of the communication from the end user, the MSO detects an assigned MAC address associated with the cable modem 14 and provides notification to the CMTS 16 regarding the MAC address of the cable modem 14.

As a result of receiving the notification regarding the cable modem operational issue, as indicated in step 108, the CMTS enables layer-2 logging for the cable modem 14. For example, with reference to FIG. 2, in response to the notification from the MSO, the CMTS controller 34 enables DOCSIS layer-2 logging feature on the CMTS 16 and enters the MAC address associated with the cable modem 14 into a set of layer-2 logging enabled MAC source addresses 40. The set of layer-2 logging enabled MAC source addresses 40 is configured, for example, as a list of cable modem MAC addresses 40 for which layer-2 logging information needs to be collected by the CMTS 16.

Returning to FIG. 2, in step 104, the CMTS 16 establishes layer-2 logging communications with the cable modem 14. As indicated above, for a DOCSIS based cable network system, such as the system 10, in the event that the cable modem 14 loses or is unable to establish layer-3 network communications with the CMTS 16, the CMTS 16 is unable to retrieve any error messages 25 generated and stored by the cable modem 14 using the layer-3 communications. Accordingly, the CMTS 16 is configured to utilize layer-2 or data link layer connection with the cable modem 14, such as provided by DOCSIS, to retrieve the error messages 25 from the cable modem 14.

Figure 3:
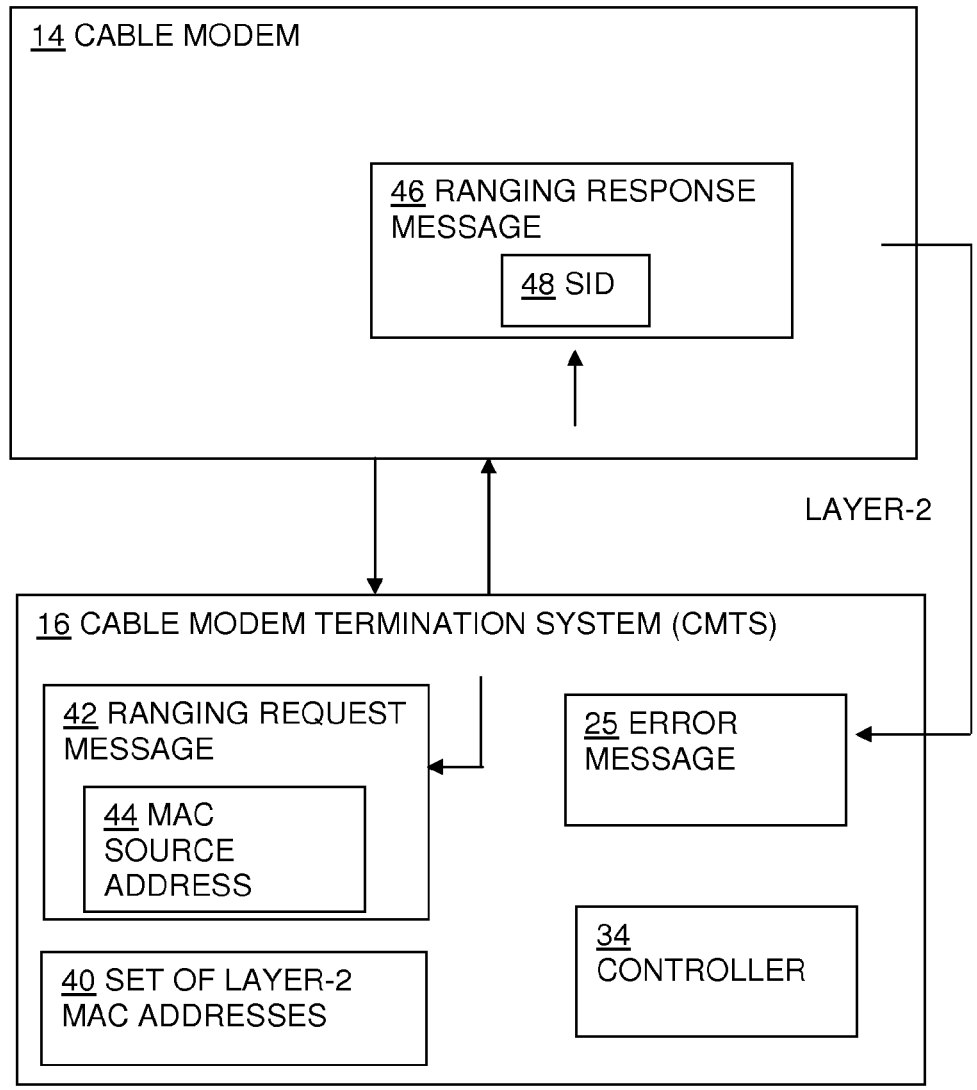
FIG. 3 illustrates an example schematic representation of a cable modem termination system and cable modem of FIG. 1.

In one arrangement, in order to establish layer-2 logging communications with the cable modem 14, as indicated in FIG. 2, the CMTS 16 first identifies the cable modem 14 as being configured to exchange layer-2 logging communications. For example, with reference to FIG. 3, once the CMTS 16 has added the MAC address of the cable modem 14 into the set of layer-2 logging enabled MAC source addresses 40, the CMTS 16 begins to monitor incoming ranging request messages 42 received from all of the cable modems within the cable network system 10. Each ranging request message 42 includes a MAC source address 44 associated with a corresponding cable modem 14. When the CMTS 16 receives ranging request messages, the CMTS 16 compares the MAC source address 44 associated with the ranging request 42 with the set of layer-2 logging enabled MAC source addresses 40.

In the event that the CMTS 16 matches the MAC source address 44 from a ranging request message 42 with a MAC address of a set of layer-2 logging enabled MAC source addresses 40, the CMTS 16 identifies a cable modem 14 associated with the MAC source address 44 as being configured to exchange layer-2 logging communications. Additionally, as a result of such matching, the CMTS 16 can identify the cable modem 14 as having encountered an operational error and as having generated an error message 25.

In response to detecting a match between the MAC source address 44 and a MAC address of a set of layer-2 logging enabled MAC source addresses 40, the CMTS 16 transmits a ranging response message 46, which includes a service identifier (SID) 48, to the identified cable modem 14. The SID 48 of the ranging response message 46 is configured as a layer-2 logging SID that causes the cable modem 14 to return the message 25 via layer-2 communications. For example, when the cable modem 14 receives the ranging response message 46, the cable modem 14 parses the message and extracts the layer-2 logging SID value 48 from the message 46 as a secondary SID. The cable modem 14 then uses the layer-2 logging SID 48 to forward the error message 25 to the CMTS 16 via layer-2 communications. For example, the cable modem 14 uses the layer-2 logging SID to transmit the error message 25 in the upstream direction toward the CMTS 16 without the requirement for IP transport. As a result, the cable modem's 14 error message(s) 25 can continue to flow into the head end 15 without the requirement for IP connectivity.

Returning to FIG. 2, in step 106, the CMTS 16 receives a message 25 from the cable modem 14 the via the layer-2 logging communications, the message 25 generated by the cable modem 25 in response to the operational issue and indicating the operational issue associated with the cable modem 14. While the message 25 can have a variety of configurations, in one arrangement, the message is configured as a system level log file (i.e., syslog) from the cable modem 14 that indicates a severity level associated with the operational issue.

In response to receiving the message 25, the CMTS 16 can be configured to perform a variety of functions relative to the message 25. For example, in one arrangement, the CMTS 16 is configured to forward the error message 25 towards a server, such as a syslog server, to allow a server operator to review the error message 25 and provide feedback to the end used of the cable modem 14. In one arrangement, the controller 34 of the CMTS 16 is configured to store the error message 25 for later retrieval and analysis by an operator.

In one arrangement, as indicated in step 112 of FIG. 2, in response to receiving a message from the cable modem 14, the CMTS 16 is configured to terminate the layer-2 logging communications with the cable modem 14. For example, once the CMTS 16 has received the error message 25 from the cable modem 14, the CMTS 16 can continue to receive ranging request messages 42 from the cable modem 14 and can continue to transmit ranging response messages 46 to the cable modem 14. In order to minimize the exchange of these messages between the CMTS 16 and the cable modem 14, the CMTS disables the layer-2 logging for the cable modem 14. Once the CMTS 16 has disabled layer-2 logging for the cable modem 14, the CMTS 16 refrains from transmitting ranging response messages 46 and the layer2-logging SIDs to the cable modem 14. As a result, in one arrangement, the cable modem 14 disables the layer-2 forwarding functionality automatically.

As indicated above, the CMTS 16 is configured to collect error messages 25, such as syslog messages, generated by a cable modem 14 using a layer-2 or data layer connection, such as provided by DOCSIS. With such a configuration, the CMTS 16 can receive error messages 25 from the cable modems in the system 10 in the absence of an IP connection with the cable modems 14. Such functionality can be used as a tool to troubleshoot and isolate cable modem 14 issues in a cable network system 10 without requiring an operator to contact a cable modem end user in an effort to retrieve error messages from the cable modem 14.

While various embodiments of the invention have been particularly shown and described, it will be understood by those skilled in the art that various changes in form and details may be made therein without departing from the spirit and scope of the invention as defined by the appended claims.

For example, as indicated above, in response to detecting a match between the MAC source address 44 and a MAC address of a set of layer-2 logging enabled MAC source addresses 40, the CMTS 16 transmits a ranging response message 46, which includes a service identifier (SID) 48, to an identified cable modem 14. According to conventional DOCSIS specifications, ranging response messages 46 include particular predefined type/length/value (TLV) encodings. For example, DOCSIS 1.1/2.0 defines seven types of TLV from 1 to 7 where types 8 to 255 are reserved for future use while. DOCSIS 3.0 defines fourteen types of TLV from 1 to 14 while types 15 to 255 are reserved for future use. Because TLV type 15 onwards are not defined by DOCSIS protocols 1.1//2.0/3.0, in one arrangement, TLV15 is configured for transmitting DOCSIS layer-2 logging SID to a cable modem 14. While TLV15 can have a variety of configurations, in one arrangement, TLV15 has a length of two bytes and values between 0x01 and 0x3FF0.

As indicated above, when the end user of the cable modem 14 detects the cable modem 14 as lacking IP functionality and/or connectivity, the end user contacts the MSO, such as by telephone, and provided the MSO with notification regarding the operational state of the cable modem 14. Such indication is by way of example only. In one arrangement, the CMTS 16 is configured to automatically detect a lack of functionality of the cable modem 14. For example, the CMTS 16 is configured to transmit a detection message, such as a ping script, to each cable modem 14 in the system 10 at a certain frequency, such as once every fifteen minutes. As a result of transmitting the detection signal, in the event that a cable modem 14 was experiencing operational issues, the CMTS 16 can detect the MAC address of the cable modem 14. For example, the CMTS 16 can retrieve an IP address associated with the cable modem 14 via the detection message and map the IP address to a MAC address associated with the cable modem 14, such as stored by the controller 34. At this point, the CMTS 16 can establish layer-2 logging communications with the cable modem 14.

As indicated above, in response to receiving the SID 48 from the CMTS, the cable modem 14 then uses the layer-2 logging SID 48 to forward the error message 25 to the CMTS 16 via layer-2 logging communications. In one arrangement, while the cable modem 14 is configured to forward the error message 25 to the CMTS 16 via layer-2 logging communications, the cable modem 14 is also configured to continue to function as documented in the DOCSIS specification. For example, if a cable modem 14 detects that it has logging information to send, the cable modem 14 can send the logging information information using the secondary layer-2 SID 48.

What is claimed is:

1. A method of operating a cable modem termination system having a data link layer connection to a cable modem, the cable modem being operative to log an operational error of the cable modem in a system level log file maintained by the cable modem, comprising:

establishing layer-2 logging communications with the cable modem by sending to the cable modem a message instructing the cable modem to send the system level log file to the cable modem termination system using the layer-2 logging communications, the layer-2 logging communications being usable by the cable modem in the absence of network-layer connectivity between the cable modem and the cable modem termination system; and subsequently receiving an error message including the system level log file from the cable modem via the layer-2 logging communications, the error message generated by the cable modem in response to the message from the cable modem termination system and indicating the operational error of the cable modem.

2. The method of claim 1, wherein establishing layer-2 logging communications with the cable modem further comprises identifying the cable modem as being configured to exchange layer-2 logging communications.

3. The method of claim 2, wherein identifying the cable modem as being configured to exchange layer-2 logging communications comprises:

receiving a ranging request from the cable modem, the ranging request having a media access control (MAC) source address associated with the cable modem; and matching the MAC source address from the ranging request with a MAC address of a set of layer-2 logging enabled MAC source addresses.

4. The method of claim 1, wherein establishing layer-2 logging communications with the cable modem comprises transmitting a ranging response message to the cable modem, the ranging response message having a service identifier (SID) configured to cause the cable modem to return the error message via layer-2 logging communications.

5. The method of claim 1, further including, upon receiving a notification of the cable modem operational error for the cable modem, enabling layer-2 logging for the cable modem.

6. The method of claim 1, further comprising, in response to receiving the error message from the cable modem, terminating the layer-2 logging communications with the cable modem.

7. The method of claim 1, wherein the system level log file includes an indication of a severity level associated with the operational error.

8. The method of claim 1, wherein the operational error prevents the cable modem from establishing a layer-3 network or IP connection with the cable modem termination system.

9. The method of claim 1, wherein the system level log file includes an identification of a network-layer facility associated with the error.

10. The method of claim 9, wherein the identification of a network-layer facility includes an identification of a dynamic host configuration protocol facility.

11. The method of claim 1, further including forwarding the system level log file to a system log server upon receiving the system level log file from the cable modem.

12. An apparatus for use in a cable modem termination system having a data link layer connection to a cable modem, the cable modem being operative to log an operational error of the cable modem in a system level log file maintained by the cable modem, the apparatus comprising a controller configured to:

establish layer-2 logging communications with the cable modem by sending to the cable modem a message instructing the cable modem to send the system level log file to the cable modem termination system using the layer-2 logging communications, the layer-2 logging communications being usable by the cable modem in the absence of network-layer connectivity between the cable modem and the cable modem termination system; and subsequently receive an error message from the cable modem including the system level log file via the layer-2 logging communications, the error message generated by the cable modem in response to the message from the cable modem termination system and indicating the operational error of the cable modem.

13. The apparatus of claim 12, wherein when establishing layer-2 logging communications with the cable modem the controller is configured to identify the cable modem as being configured to exchange layer-2 logging communications.

14. The apparatus of claim 13, wherein when identifying the cable modem as being configured to exchange layer-2 logging communications, the controller is configured to:

receive a ranging request from the cable modem, the ranging request having a media access control (MAC) source address associated with the cable modem; and match the MAC source address from the ranging request with a MAC address of a set of layer-2 logging enabled MAC source addresses.

15. The apparatus of claim 12, wherein when establishing layer-2 logging communications with the cable modem, the controller is configured to transmit a ranging response message to the cable modem, the ranging response message having a service identifier (SID) configured to cause the cable modem to return the error message via layer-2 logging communications.

16. The apparatus of claim 12, wherein when receiving notification of the cable modem operational error for the cable modem, the controller is configured to enable layer-2 logging for the cable modem.

17. The apparatus of claim 12, wherein the controller is configured to, in response to detecting the operational error, terminate the layer-2 logging communications with the cable modem.

18. The apparatus of claim 12, wherein the system level log file includes an indication of a severity level associated with the operational error.

19. The apparatus of claim 12, wherein the operational error prevents the cable modem from establishing a layer-3 network or IP connection with the cable modem termination system.

20. A system, comprising:

a cable modem operative to log an operational error of the cable modem in a system level log file maintained by the cable modem; and a cable modem termination system having a data link layer connection to the cable modem, configured to:

establish layer-2 logging communications with the cable modem by sending to the cable modem a message instructing the cable modem to send the system level log file to the cable modem termination system using the layer-2 logging communications, the layer-2 logging communications being usable by the cable modem in the absence of network-layer connectivity between the cable modem and the cable modem termination system; and subsequently receive an error message from the cable modem including the system level log file via the layer-2 logging communications, the error message generated by the cable modem in response to the message from the cable modem termination system and indicating the operational error of the cable modem.

21. The system of claim 20, wherein when establishing layer-2 logging communications with the cable modem the cable modem termination system is configured to identify the cable modem as being configured to exchange layer-2 logging communications.

22. The system of claim 21, wherein when identifying the cable modem as being configured to exchange layer-2 logging communications, the cable modem termination system is configured to:
   receive a ranging request from the cable modem, the ranging request having a media access control (MAC) source address associated with the cable modem; and
   match the MAC source address from the ranging request with a MAC address of a set of layer-2 logging enabled MAC source addresses.

23. The system of claim 20, wherein when establishing layer-2 logging communications with the cable modem, the cable modem termination system is configured to transmit a ranging response message to the cable modem, the ranging response message having a service identifier (SID) configured to cause the cable modem to return the error message via layer-2 logging communications.

24. The system of claim 20, wherein the cable modem termination system is configured to, in response to detecting the operational error, the cable modem termination system is configured to terminate the layer-2 logging communications with the cable modem.

25. The system of claim 20, wherein the system level log file includes an indication of a severity level associated with the operational error.

26. The system of claim 20, wherein the operational error prevents the cable modem from establishing a layer-3 network or IP connection with the cable modem termination system.

* * * * *